US008612778B2

(12) United States Patent
Cho

(10) Patent No.: US 8,612,778 B2
(45) Date of Patent: Dec. 17, 2013

(54) TERMINAL DEVICE CAPABLE TO OPERATE AT A DUAL POWER FEEDING MODE FOR SUPPORTING A DUAL-MODE CONFIGURATION HAVING TWO DIFFERENT WIRELESS COMMUNICATION MODULES

(75) Inventor: Young Tack Cho, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 379 days.

(21) Appl. No.: 12/722,767

(22) Filed: Mar. 12, 2010

(65) Prior Publication Data

US 2010/0235657 A1 Sep. 16, 2010

(30) Foreign Application Priority Data

Mar. 16, 2009 (KR) ........................ 10-2009-0022084

(51) Int. Cl.
  G06F 1/00 (2006.01)
  H04B 1/38 (2006.01)
  H02H 3/08 (2006.01)

(52) U.S. Cl.
  USPC ........... 713/300; 713/310; 455/574; 361/93.1

(58) Field of Classification Search
  USPC .......... 370/331, 338, 311; 455/574, 552, 426, 455/440; 713/300, 310; 361/93.9
  See application file for complete search history.

(56) References Cited

U.S. PATENT DOCUMENTS

| | | | |
|---|---|---|---|
| 6,363,260 B1 * | 3/2002 | Achour et al. ............. | 455/553.1 |
| 6,865,063 B2 * | 3/2005 | Ball ............................ | 361/93.9 |
| 7,031,673 B1 * | 4/2006 | Maeda ........................ | 455/115.1 |
| 7,486,964 B2 * | 2/2009 | Noh ............................ | 455/552.1 |
| 7,627,339 B2 * | 12/2009 | Lin et al. .................... | 455/552.1 |
| 7,660,283 B2 * | 2/2010 | Kaneko ......................... | 370/332 |
| 7,660,565 B2 * | 2/2010 | Patel et al. ................... | 455/132 |
| 7,761,117 B2 * | 7/2010 | Park ............................. | 455/566 |
| 7,912,010 B2 * | 3/2011 | Ito et al. ....................... | 370/331 |
| 8,155,694 B2 * | 4/2012 | Lee ............................. | 455/552.1 |
| 8,472,999 B2 * | 6/2013 | Zhang ......................... | 455/552.1 |
| 8,504,101 B2 * | 8/2013 | Urushihara et al. ......... | 455/552.1 |
| 2003/0050103 A1 * | 3/2003 | Tourrilhes et al. ............ | 455/574 |
| 2004/0003307 A1 * | 1/2004 | Tsuji ............................ | 713/310 |
| 2005/0181822 A1 * | 8/2005 | Sasaki et al. ............... | 455/552.1 |
| 2006/0047982 A1 * | 3/2006 | Lo et al. ....................... | 713/300 |
| 2006/0164773 A1 * | 7/2006 | Stanford et al. ............. | 361/93.1 |
| 2006/0274698 A1 * | 12/2006 | Twitchell, Jr. ................ | 370/331 |
| 2007/0026866 A1 * | 2/2007 | Krishnamurthi et al. ...... | 455/440 |
| 2007/0104107 A1 * | 5/2007 | Alapuranen .................. | 370/238 |
| 2007/0171882 A1 * | 7/2007 | Lee ............................... | 370/338 |
| 2008/0026745 A1 * | 1/2008 | Grubb ......................... | 455/426.1 |
| 2008/0032628 A1 * | 2/2008 | Vehvilainen et al. ........ | 455/41.2 |
| 2008/0167090 A1 * | 7/2008 | Athalye ........................ | 455/574 |
| 2008/0207246 A1 * | 8/2008 | Shanbhag et al. ............ | 455/522 |

(Continued)

Primary Examiner — Thomas Lee
Assistant Examiner — Aurel Prifti
(74) Attorney, Agent, or Firm — Cha & Reiter, LLC

(57) ABSTRACT

An apparatus and method for controlling a terminal having two modules connected to a network at power feeding in dual modes. A first power supply feeds main electric power via a main current limiting unit to a first controller and a second controller. The first controller controls a first wireless communication unit using the main electric power and changes a connection state with a first network by checking a connection state of a sub-electric power and determining whether connection with a second network is accessible in accordance with a request for the connection with the second network. A second controller controls a second wireless communication unit for connection to the second network using the main electric power.

16 Claims, 6 Drawing Sheets

(56) References Cited

U.S. PATENT DOCUMENTS

2008/0227482 A1\* 9/2008 Lin et al. .................... 455/552.1
2009/0168676 A1\* 7/2009 Olson .......................... 370/311
2009/0217048 A1\* 8/2009 Smith .......................... 713/176
2009/0245171 A1\* 10/2009 Suzuki et al. ................ 370/328

\* cited by examiner

TERMINAL DEVICE CAPABLE TO OPERATE AT A DUAL POWER FEEDING MODE FOR SUPPORTING A DUAL-MODE CONFIGURATION HAVING TWO DIFFERENT WIRELESS COMMUNICATION MODULES

CLAIM OF PRIORITY

This application claim the benefit of priority from Korean patent application No. 10-2009-0022084 filed Mar. 16, 2009, the contents of which are hereby incorporated by reference in its entirety.

BACKGROUND OF THE INVENTION

1. Field of the Invention

The present invention relates to a terminal having Universal Serial Bus (USB) interface connecting function. More particularly, the present invention relates to a method and apparatus for controlling a system in dual power feeding mode of the terminal electrical power of which is fed from an electronic device to the terminal through the USB.

2. Description of the Related Art

Recently, as services using a public wireless Local Area Network (LAN) have increased in both availability and popularity, a high speed wireless Internet connection is formed typically using an electronic device such as a Personal Computer (PC), a laptop computer, a netbook computer, mobile terminal, etc. Such an Internet connection service through the public wireless LAN is now able to provide almost the same quality of service as in a wired environment. However, the Internet connection service has variously different degrees of coverage according to the particular network, inferior mobility, and is limited in being able to provide a service with high reliability and without deficiency. In order to overcome some of the shortcomings, there has been developed a portable terminal that is connected to Internet by accessing dual networks. Therefore, a user may use Internet services more conveniently through two different networks.

In order to feed sufficient electric power from an electronic device to a terminal having a USB function, a system has been constructed to utilize a USB cable or a battery provided in the terminal. In this case, the terminal may be a dongle type and is fed with the electric power from the electronic device by mounting an additional battery in the terminal or inserting cables into two USB ports of the electronic device respectively.

However, in order to feed a large amount of electric power from the electronic device to the battery of the terminal, the battery must have a large size relative to the terminal to have sufficient capacity to power prolonged operations. Due to this shortcoming, the terminal becomes larger in size than desired by consumer demand, poor in design, and relatively expensive as a price of the battery increases.

Moreover, in a case of charging a battery of the terminal using the electronic device, a temporary current shortage may occur in the electronic device due to the battery being charged.

In addition, when the terminal receives the electric power from the electronic device using a USB cable without providing a current limiting circuit, electric current fed from the electronic device cannot be limited, so that the operation of the electronic device may be limited in function because of the amount of current fed from the electronic device to other devices.

SUMMARY OF THE INVENTION

The present invention provides a method and an apparatus for differently controlling a system in dual-power feeding modes of a terminal.

The present invention also provides a method and an apparatus for enabling a stable control of a system, even in the case of insufficient electric power feeding.

In accordance with an exemplary embodiment of the present invention, there is provided an apparatus for controlling a terminal including at least two modules connected to a network at electric power feeding in dual modes, the apparatus preferably including: a first power supply feeding a main electric power, a main current limiting unit coupled with the first power supply; a first controller controlling a first wireless communication unit using the main electric power fed from the first power supply and changing a connection state with a first network by checking a connection state of a sub-electric power and determining whether connection with a second network is possible (i.e. accessible) in accordance with a request for the connection with the second network; and a second controller controlling a second wireless communication unit for connection to the second network using the main electric power fed from the first power supply; wherein the main current limiting unit limits a current of the main electric power fed from an electronic device, to a first controller and a second controller. In accordance with another exemplary embodiment of the present invention, there is provided a method of controlling a terminal including at least two modules connected to a network connection at electric power feeding in dual modes, including: determining whether or not a main electric power is being fed from an electronic device; connecting to a first network according to a request for connection to the first network when the main electric power is being fed; determining whether or not connection to a second network is possible when a request for connection with the second network is generated during the connection and data communication with the first network; determining whether or not the sub-electric power is being fed when the connection with the second network is made; and changing a connected state to the first network according to the feeding of the sub-electric power.

According to the present invention, even when an insufficient amount of electric power is being fed, a terminal having a dual system may perform a handover and data communication in accordance with received signal strength indicator (RSSI) of the network to which the terminal belongs so that a user may use the terminal as efficiently as possible.

Moreover, when sufficient electric power is being fed, the electric power feeding is enabled by an internal device of the terminal so that stability of the electronic device may be increased and the function of the dual system may be maintained.

BRIEF DESCRIPTION OF THE DRAWINGS

The exemplary objects, features and advantages of the present invention will be more apparent from the following detailed description in conjunction with the accompanying drawings, in which.

DETAILED DESCRIPTION

Hereinafter, exemplary embodiments of the present invention are described in detail with reference to the accompanying drawings. In this description, well-known constructions and configurations may be omitted to avoid obscuring appreciation of the subject matter of the present invention by a person of ordinary skill in the art.

The mobile terminal of the present invention may comprise any type of information and/or communication appliance and/or multimedia appliance, such as a mobile communication terminal, digital broadcast receiving terminal, personal digital assistant (PDA), smart phone, international mobile telecommunications 2000 (IMT 2000) terminal, wideband code division multiple access (WCDMA) terminal, or universal mobile telecommunications system (UMTS) terminal, just to name some possibilities.

Figure 1:
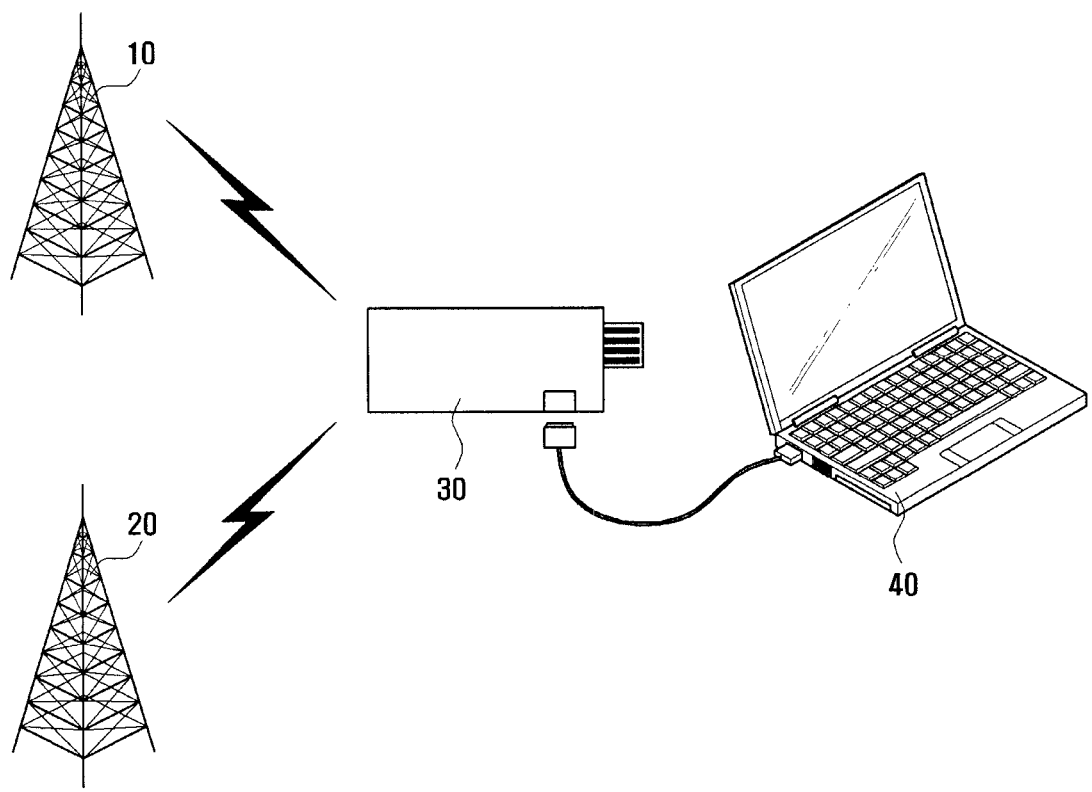
FIG. 1 illustrates an exemplary configuration of a system according to an exemplary embodiment of the present invention.

FIG. 1 illustrates configuration of a system according to an exemplary embodiment of the present invention.

Referring now to FIG. 1, a system according to the exemplary embodiment of the present invention preferably includes a first base station 10, a second base station 20, a terminal 30 and an electronic device 40. Hereinafter, the main subject of an exemplary embodiment of the present invention is the terminal 30. A user of the electronic device 40 may input a control command to the terminal 30 through USB communication and the terminal 30 may be operated by the control command.

The terminal 30 establishes a communication channel with the first base station 10 or the second base station 20 to support the electronic device 40 to perform data communication. At this time, the terminal 30 may support a dual-mode configuration having two different wireless communication modules, and perform a communication with a corresponding base station. For example, the terminal 30 may be connected to the first base station 10 through a CDMA wireless communication and to the second base station 20 in a Worldwide Interoperability for Microwave Access (Wimax) wireless communication. The terminal 30 may be connected to the first base station 10 in a global system for mobile communications (GSM) wireless communication and to the second base station 20 in a Wimax wireless communication. Additionally, the terminal 30 may be connected to the first base station 10 in a High Speed Downlink Packet Access (HSDPA) wireless communication and to the second base station 20 in a Wimax wireless communication. The aforementioned examples do not limit nor should any presumption be made that one of the protocols is always Wimax in the claimed invention.

The terminal 30 may receive identification (ID) or password data required to for user authentication from the electronic device 40 and transmit the same to a corresponding base station for the connection to the corresponding base station through each wireless communication path. After data regarding user authentication is received from the corresponding base station, the terminal 30 may perform data communication via the corresponding base station. At this time, the user authentication may be omitted in wireless communications using a common wireless communication.

The electronic device 40 may be connected to the terminal 30 through a USB port directly or through a USB cable. The electronic device 40 may feed electric power to the terminal 30 for operation of the terminal and perform data communication with the terminal 30. The electronic device 40 may comprise a personal computer (PC) or a laptop computer performing USB communication. When the electronic device 40 is connected to the terminal 30 through the USB cable, the electronic device 40 may feed only the electric power to the terminal 30 through the USB port. In addition, the electric device 40 may transmit data for the user authentication used in various wireless communications protocols to the corresponding base station through the terminal 30.

Figure 2:
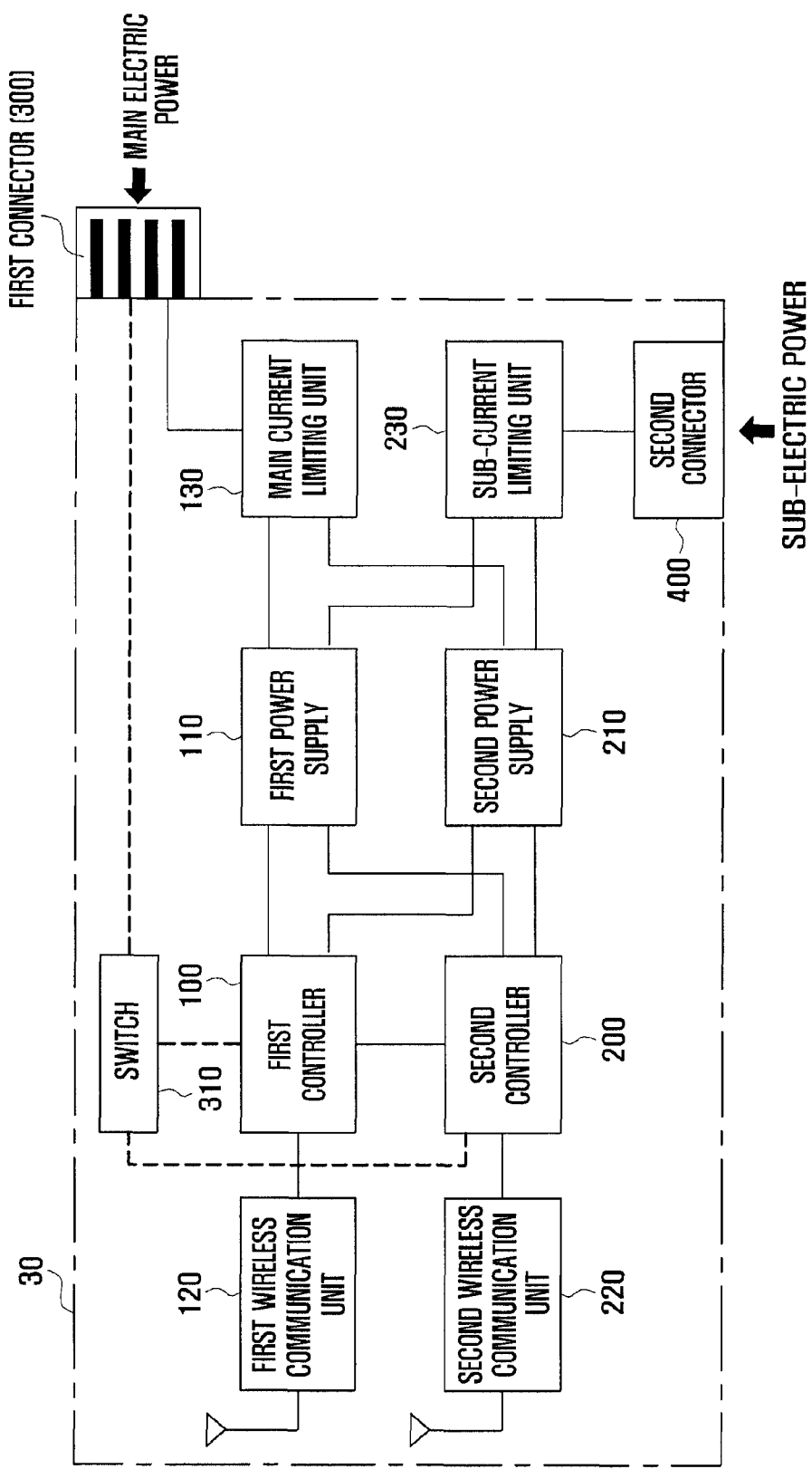
FIG. 2 is a block diagram illustrating configuration of a terminal according to an exemplary embodiment of the present invention.

FIG. 2 is a block diagram schematically illustrating configuration of a terminal according to an exemplary embodiment of the present invention.

Referring now to FIG. 2, the terminal 30 preferably includes a first controller 100, a first power supply 110, a first wireless communication unit 120, a main current limiting unit 130, a second controller 200, a second power supply 210, a second wireless communication unit 220, a sub-current limiting unit 230, a first connector 300, a second connector 400, and a switch 310.

The first connector 300 may be coupled with an electric device 40 such that a main electric power may be fed from the electronic device 40 to the terminal 30 through a USB cable. Thus, the first connector 300 provides a physical interface electrically connecting the USB cable with the terminal 30. The first connector 300 may be connected directly to the electronic device 40 without using the USB cable. The first connector 300 may transmit a data signal between the electronic device 40 and the terminal 30. For example, the first connector 300 preferably includes a USB plug, delivers a main electric power fed from the electronic device 40 to the terminal 30, and connects the terminal 30 to the electronic device 40 for data communication therebetween.

The second connector 400 serves as a path through which the sub-electric power is fed from the electronic device 40 to the terminal 30. The second connector 400 comprise a USB socket and be connected to the electronic device 40 with the USB cable.

The switch 310 switches transmission of a data signal between the electronic device 40 and the first controller 100 or between the electronic device 40 and the second controller 200. At this time, the switch 310 may receive the data signal for connection to the first network from the first controller 100 and transmit the data signal to the electronic device 40 through the first connector 300, or receive the data signal for the connection to the second network from the second controller 200 and provide the data signal to the electronic device 40 through the first connector 300.

The main current limiting unit 130 limits the current of the main electric power fed from the electronic device 40 through the first connector 300. By doing so, the first terminal 30 limits the electric power with a preset current to be fed. Thus, the main current limiting unit 130 prevents electric power with a preset current from being fed to the terminal 30 through the USB at a level where the function of the electronic device 40 is restricted.

The first power supply 110 feeds the electric power to respective elements of the terminal 30 according to a control signal from the first controller 100. The first power supply 110 receives a reduced level of the main electric power as limited through the main current limiting unit 130 or a reduced level of sub-electric power of current as limited through the sub-current limiting unit 230. The first power supply 110 may feed the main electric power to the second controller 200 under the control of the second controller 200.

The first wireless communication unit 120 transmits and receives radio frequency (RF) signals, performs channel coding and according to some protocols performs spreading of data to be transmitted, and can performs de-spreading and channel decoding of received data. At this time, the first wireless communication unit 120 may transmit a signal for the connection with the first network to the first base station 10 under the control of the first controller 100. Then, the first wireless communication unit 120 may transmit a data signal relating to the connection to the first network, received from the first base station 10, to the first controller 100.

With continued reference to FIG. 2, the first controller 100 may control overall functions of the terminal 30 and the first wireless communication unit 120 to establish a communication channel with the first base station 10 and to transmit and receive various data. At the connection with the electronic device 40 through the first connector 300, the first controller 100 may receive a data signal from the electronic device 40. When the data signal is received, the first controller 100 may control the function of the first power supply 110. After that, the first controller 100 may control the first wireless communication unit 120 to connect to the first network using the main electric power fed from the electronic device 40.

The first controller 100 may receive a data signal requesting connection to the second network from the electronic device 40 during the connection with the first network. When the terminal 30 is located in a service area of the second network and the electronic device 40 requests for connection with the second network, the first controller 100 may determine whether the sub-electric power for the connecting with the second network is being fed through the second wireless communication unit 220. The first controller 100 maintains the transmission and reception of the data signal to and from the first network when the sub-electric power is fed. On the contrary, when the sub-electric power is not being fed, the first controller 100 changes the connected state with the first network to secure electric power required for the connection with the second network. More particularly, the first controller 100 may control operation for the connection with the first network according to the RSSI to save the main electric power fed from the electronic device 40. In more detail, the first controller 100 may limit transmission of the data signal performed by the terminal 30 through the first network and control the terminal only to receive the data signal when the RSSI of the first network measured by the terminal 30 is higher than a preset value. The first controller 100 may control the terminal 30 to receive the data signal from the first base station 10 at a preset time interval. Moreover, when the RSSI of the first network measured by the terminal 30 is lower than a preset value, the first controller 100 can control the terminal 30 to be switched to a sleep mode where the terminal 30 does not transmit and receive data signals to and from the first base station 10. The reason for switching to sleep mode is because, when the RSSI is weak, the power consumption of the terminal 30 for the communication with the first base station 10 typically increases. When the user requests for the connection with the second network during the connection with the first network, the first controller 100 may shift the control for various functions of the terminal 30 onto the second controller 200.

At the connection with the first network through the first wireless communication unit 120, the first controller 100 may control the user authentication to be automatically performed according to a setting of the terminal 30. In other words, when the electronic device 40 requests connection with the first network, the first controller 100 may control the first wireless communication unit 120 to transmit data on the ID and a password of the user, received from the electronic device 40, to the first base station 10. At this time, the first controller 100 may perform the user authentication in association with the first base station 10 simultaneously with the user request for connection with the first network.

When the terminal 30 is fed with the main electric power and the sub-electric power from the electronic device 40 simultaneously, the first controller 100 may check the state of the connection with the first network performed using the main electric power. When additional electric power is required for the connection with the first network as a result of the checking, the first controller 100 may control the first wireless communication unit 120 to be connected with the first network using the main electric power and the sub-electric power together. At this time, a data signal delivered from the electronic device 40 may be transmitted to the terminal 30 through the first connector 300.

The second power supply 210 may feed the sub-electric power to respective elements of the terminal 30 according to a control signal from the second controller 200. The second power supply 210 may receive the sub-electric power with current higher than a preset current through the sub-current limiting unit 230 or the main electric power with current lower than a preset current through the main current limiting unit 130. Moreover, the second power supply 210 can feed the sub-electric power to the first controller 100 under the control of the first controller 100.

The second wireless communication unit 220 transmits and receives an RF signal and depending on the protocols performs channel coding and spreading of data to be transmitted or de-spreading and channel decoding of received data. In this case, the second wireless communication 220 may comprise a signal for to the connection with the second network to the second base station 20 under the control of the second controller 200. Then, the second wireless communication 220 may transmit the data signal on the connection with the second network, received from the second base station 20, to the second controller 200.

With continued reference to FIG. 2, the sub-current limiting unit 230 limits the current of the sub-electric power fed from the electronic device 40 through the second connector 400. Thus, the terminal 30 may limit the electric power fed when the current is higher than a preset current, to restrict the amount of current being fed from the electronic device 40. For example, the sub-current limiting unit 230 prevents the electric power with current higher than a preset current from being fed to the terminal 30 through the USB and the function of the electronic device 40 from being limited.

The second controller 200 controls overall function of the terminal 30 and controls the second wireless communication unit 220 to establish a communication channel with the second base station 20 and to transmit and receive various data. The second controller 200 may also control various functions of the terminal 30 instead of the first controller 100 when any one of the above-mentioned elements requests for the connection with the second network. When the second connector 400 is connected to the electronic device 40, the second controller 100 may be connected to the electronic device 40 by the switch 310 and control the second wireless communication unit 120 to be connected to the second network using a data signal received from the electronic device 40. Then, the second controller 200 may transmit a data signal for the connection with the second network to the electronic device 40.

When the terminal 30 is located in a service area of the second network, the second controller 200 may perform the user authentication for the connection with the second network according to the request of the electric device 40 for connection with the second network. The second controller 200, for the user authentication, may receive information on the user authentication, used for the connection with the first network, from the first controller. That is, when the ID information and the password information of the user stored in the first controller 100 may be received, the second controller 200 may automatically perform the user authentication for the connection with the second network.

When the user authentication for the connection with the second network is completed, the second controller 200 may control the second wireless communication unit 220 to be connected to the second network and to perform data communication. When the terminal 30 is located in a service area of the first network, the second controller 200 may also determine whether the sub-electric power is to receive electric power required for the connection with the first network through the first wireless communication unit 120 according to the request for the connection with the first network input from a user during the connection with the second network. The second controller 200 controls the second wireless communication unit 220 to maintain the data signal transmission and reception to and from the second network when the sub-electric power is supplied. On the other hand, when the sub-electric power is not being fed, the second controller 200 changes the connected state with the second network to secure electric power required for the connection with the first network. For example, the second controller 200 may control the operation relating the connection with the second network according to the RSSI to save the main electric power fed from the electronic device 40. In more detail, when the RSSI of the second network measured by the terminal 30 is higher than a preset value, the second controller 200 may control the terminal 30 to be limited in transmitting but receiving a data signal through the second network. In this case, the second controller 200 may control the terminal 30 to receive the data signal from the second base station 20 at a preset time interval. When the RSSI of the first network measured by the terminal 30 is lower than a preset value, the second controller 200 may control the terminal 30 to be shifted into a sleep mode when the terminal 30 does not transmit and receive the data signal to and from the second base station 20. The reason for shifting into sleep mode is because the weak RSSI causes increased power consumption of the terminal 30 required for the communication with the second base station 20. When the sub-electric power is not fed from the electronic device 40, the second controller 200 may finish the connection with the second network.

Figure 3A:
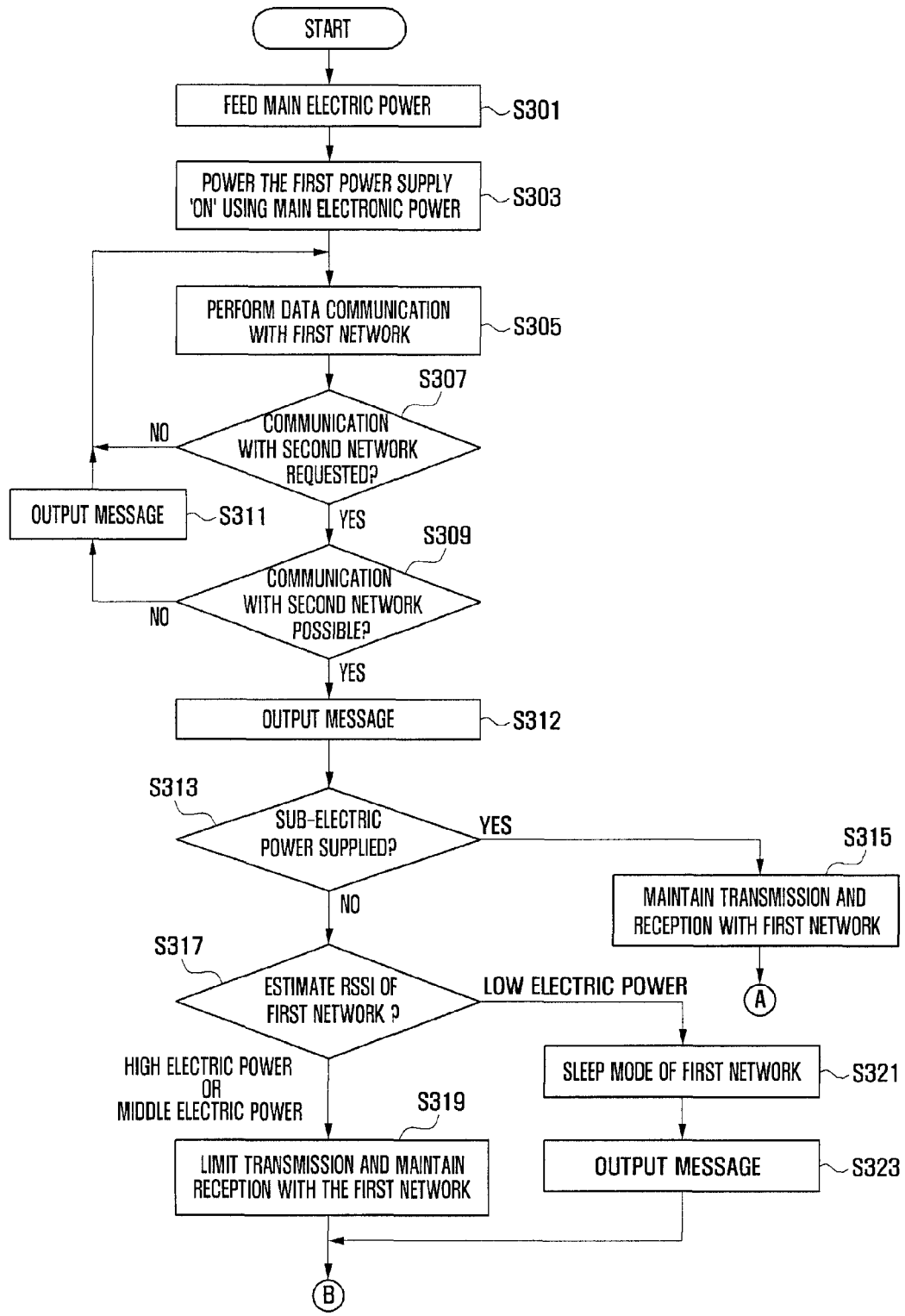
FIGS. 3a to 3c are flowcharts illustrating a dual system control method using a main electric power and a sub-electric power of a terminal according to an exemplary embodiment of the present invention.
Figure 3B:
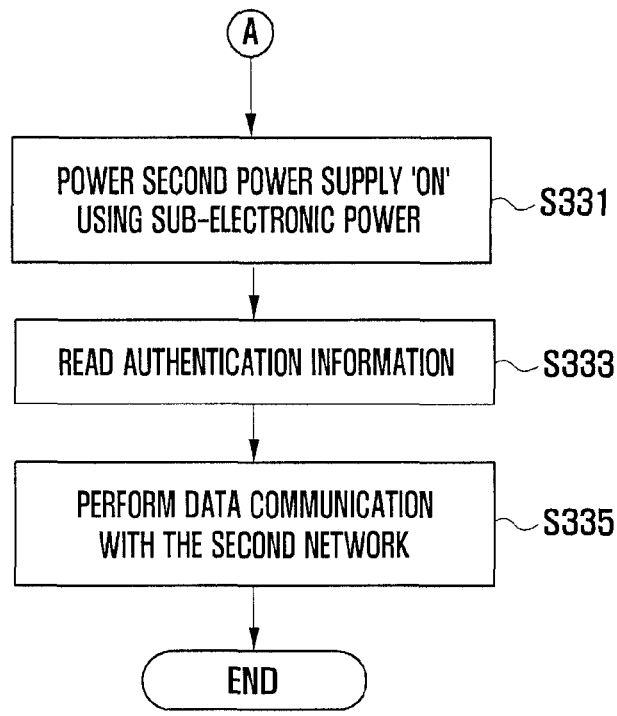
Figure 3C:
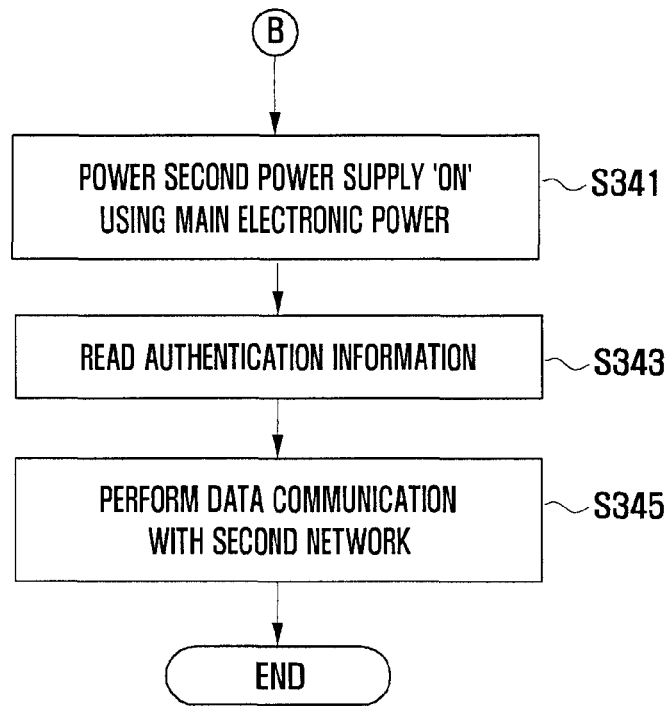
Figure 4A:
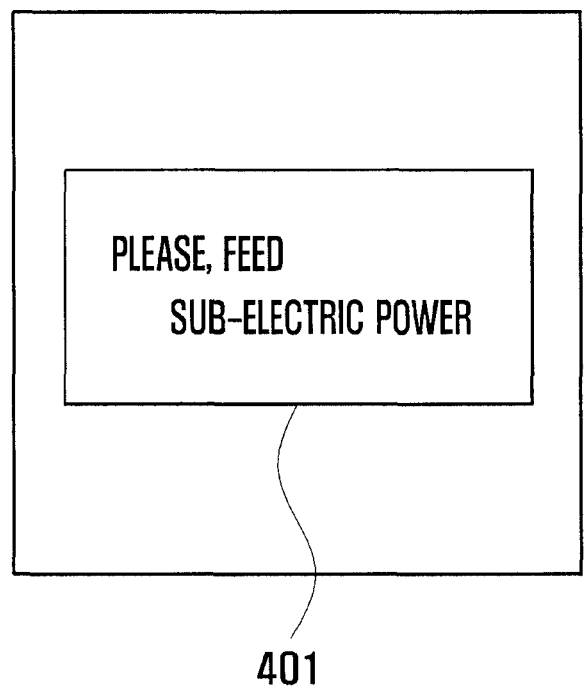
FIGS. 4a to 4c are exemplary screens illustrating a dual system control method using a main electric power and a sub-electric power of a terminal according to an exemplary embodiment of the present invention.
Figure 4B:
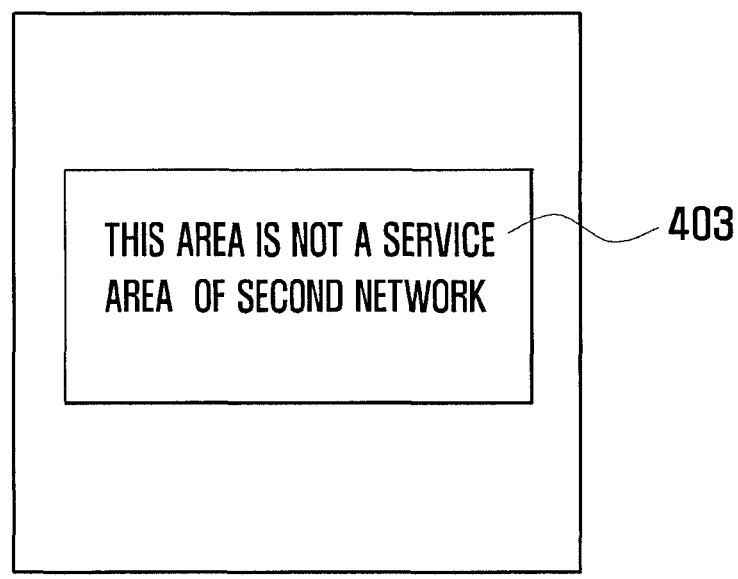
Figure 4C:
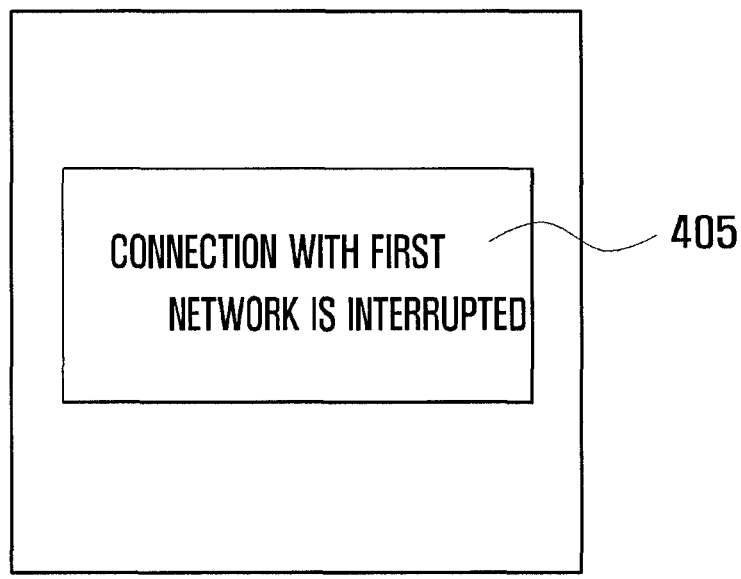

FIGS. 3a to 3c are flowcharts illustrating a dual-system control method using main electric power and sub-electric power of the terminal according to an exemplary embodiment of the present invention. FIGS. 4a to 4c are exemplary screens illustrating a dual-system control method using a main electric power and sub-electric power of the terminal according to an exemplary embodiment of the present invention.

Referring now to FIGS. 3a to 3c, at step (S301), the terminal 30 may be connected (i.e. coupled) to the electronic device 40 through the first connector 300. When the terminal 30 is connected to the electronic device 40, the main electric power can be fed from the electronic device 40 to the terminal 30 and current of the feeding main electric power can be limited by the main current limiting unit 130. The terminal 30 may be connected to the electronic device 40 through the USB cable or directly by a plug type connector. When the main electric power is fed from the electronic device 40, the terminal 30 may be set such that the first controller 100 works first.

When the main electric power is fed from the electronic device 40, the first controller 100 may receive a data signal from the electronic device 40 through the connector connected to the electronic device 40. The data signal may be transmitted to the first controller 100 via the switch 310. The switch 310 may switch the transmission of the data signal from the electronic device 40 to one of the first controller 100, or the second controller 200 according to the control of the first controller 100 or the second controller 200.

At step (S303), when the data signal is received, the first controller 100 may turn the first power supply 110 'ON' using the main electric power. The main electric power is then fed to the first power supply 110 through the main current limiting unit 130 to limit the amount of current fed therethrough.

At step (S305), when the first power supply 110 is turned on, the first controller 100 may control the first wireless communication unit 120 to be connected to the first network and to perform data communication. The first controller 110 may automatically perform the user authentication according to settings of the terminal 30 for the connection with the first network through the first wireless communication unit 120 when the information for the user authentication, such as an ID and a password of a user are stored in advance. In other words, when the electronic device 40 requests a connection with the first network, the first controller 100 may set the first wireless communication unit 120 to transmit automatically the data on the ID and the password of the user to the first base station 10. By doing so, the first controller 100 may perform the user authentication with the first base station 10 simultaneously with the request for the connection with the first network. In this case, the data communication may include Internet service and text messaging service.

Although the connection with a network using user authentication information stored in the terminal 30 for the network connection or information input from the electronic device 40 has been described hereinbefore, the authentication may be performed based on a serial number of the electronic device 40 or the terminal 30, for example MAC address.

At step (S307), the first controller 100 may sense a signal of requesting for the connection with the second network input by a user of the electronic device 40 during the connection with the first network and performance of the data communication.

At (S309), when the request for the connection with the second network is sensed, the first controller 100 checks whether or not the connection with the second network is possible (i.e. can be made). In more detail, the first controller 100 controls the first power supply 110 to feed the main electric power to the second controller 200. The second controller 200 may determine whether or not the connection with the second network using the second wireless communication unit 220 is possible. When the terminal 10 is currently located in a service are of the second network, at step (S312) the second controller 200 may transmit a data signal controlling the electronic device 40 to output a message requesting sub-electric power on a screen of the electronic device 40 through the first connector 300. For example, as illustrated in FIG. 4a, a message, "Please, feed sub-electric power" 401 may be displayed on the screen of the electronic device 40. When the terminal 10 is not located currently in a service area of the second network, meaning, the connection with the second network is impossible (i.e. cannot be made) in the current area, at step (S311) the second controller 200 may transmit a data signal to the electronic device 40 through the first connector 300 such that the electronic device outputs a message of indicating information on the current network connection to a user to the screen of the electronic device 40. For example, as illustrated in FIG. 4b, a message, "This area is not a service area of the second network" 403 may be displayed, for example, on the screen of the electronic device 40. A person of ordinary skill in the art should appreciate that other indications, pictorial, text, or graphical in nature can be used (for example "N2" could have a red circle around it or a line through it, or blink, or flash in a certain color to indicate there is no connection with the second network). Then, at step (S305) the first controller 100 typically maintains the data communication with the first network as communication cannot be made or is not of sufficient quality outside of the service area of the second network.

At step (S313), the first controller 100 may determine whether the sub-electric power is fed.

When the terminal 10 is connected to the second network by the user request of the electronic device 40 during the connection with the first network only using the main electric power, since power consumption at the connection with the second network differs, the terminal 30 may be fed with the sub-electric power from the electronic device 40 to stabilize electric power of the terminal 30. When the connection with the second network is requested, the second controller 200 may control various functions of the terminal 30 instead of the first controller 100. When the sub-electric power is fed through the second connector 400, the second controller 200 may be fed with a stable electric power with a current lower than a preset current through the sub-current limiting unit 230.

When the sub-electric power is fed, at step (S315) the first controller 100 may maintain data transmission and reception to and from the first base station 10. For example, the first controller 100 may maintain the state of being connected to the first network. After that, at step (S331), the second controller 200 may turn the second power supply 210 'ON' using the sub-electric power.

When the second power supply 210 is driven, at step (S333) the second controller 200 may read information on the user authentication from the first controller 100. That is, the second controller 200 may receive information on the user authentication used at the connection with the first network to perform the user authentication from the first controller 100. Thus, the second controller 200 may perform the user authentication required for the connection with the second network using ID and password of a user received from the first controller 100.

When the user authentication is completed, at step (335) the second controller 200 may be connected to the second network by controlling the second wireless communication unit 220. When connected to the second network, the second controller 200 controls the data transmission and reception so that the user of the electronic device 40 may perform data communication with the second network.

Meanwhile, when the sub-electric power is not fed, at step (S317) the first controller 100 may estimate the RSSI for the connection with the first network. The first controller 100 can receive data on the RSSI corresponding to a current location of the terminal 30 from the first station 10 or may detect directly the strength of a signal being currently received by the terminal 30. The first controller 100 can analyze the data on the RSSI and may limit the connection with the first network according to corresponding strength. In more detail, when the RSSI is higher than a preset value, then at step (S319) the first controller 100 may restrict the data transmission to the first base station 10 and perform only the reception from the first base station 10. The terminal 30 may be controlled to receive a data signal from the first base station 10 through the first wireless communication unit 120 at a preset time interval. When the RSSI is lower than a preset value, then at step (S321) the first controller 100 may not perform the transmission and reception of the data signal to and from the first base station 10, but may shift to a sleep mode where the network connection is interrupted. The first controller 100 may prevent the first power supply 110 from being completed. The first controller 100 may transmit a data signal through the first connector 300 such that at step (S323) the electronic device 40 outputs a message of indicating the interruption of the connection with the first network on the screen of the electronic device 40. For example, as illustrated in FIG. 4c, the message, "Connection to the first network is interrupted" 405, may be displayed on the screen of the electronic device 40.

Next, at step (S341) the second controller 200 may turn the second power supply 210 'ON' using the main electric power.

When the second power supply 210 is driven, at step (S343) the second controller 200 may read information on the user authentication from the first controller 100. That is, the second controller 200 may receive information on the user authentication, used at the connection with the first network to perform the user authentication, from the first controller 100. By doing so, the second controller 200 may perform the user authentication required for the connection with the second network using the ID and password of the user received from the first controller 100.

When the user authentication is completed, at step (S345) the second controller 200 may control the second wireless communication unit 220 to be connected to the second network. When connected to the second wireless communication network, the second controller 200 controls the data transmission and reception such that the user of the electronic device 40 may perform the data communication to and from the second network.

The above-described methods according to the present invention can be realized in hardware or as software or computer code that can be stored in a recording medium such as a CD ROM, a RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims.

What is claimed is:

1. An apparatus for controlling a terminal comprising at least two modules connected to a network in a dual power feeding mode, the apparatus comprising:

a first power supply for feeding main electric power to units of the terminal;

a main current limiting unit coupled to said first power supply for limiting a current of the main electric power;

a first controller coupled to the first power supply for controlling a first wireless communication unit using the main electric power fed from an electronic, determining whether connection with a second network is accessible in accordance with a request for connection with the second network, and changing a connection state with a first network according to whether sub-electric power is being fed from the electronic device when the connection with the second network is accessible; and a second controller coupled to the first power supply for controlling a second wireless communication unit for connection with the second network using the main electric power fed from the first power supply, wherein when an insufficient amount of main electric power is being fed for operation, the terminal utilizes the dual power feeding mode of the apparatus to perform a handover and data communication in accordance with a received signal strength indicator (RSSI) of a particular network to which the user belongs, and wherein the main current limiting unit limits the current of the main electric power or the sub-electric power fed from the electronic device, to the first controller and the second controller, to a level where the function of the external electronic device is not restricted.

2. The apparatus of claim 1, further comprising:
a second power supply coupled to the first controller, the second controller and the main current limiting unit;
a sub-current limiting unit coupled to the first power supply and the second power supply for limiting a current of the sub-electric power fed by a Universal Serial Bus (USB) connection with the electronic device and feeding the sub-electric power to the first power supply and the second power supply.

3. The apparatus of claim 1, wherein the first controller maintains transmission and reception a data signal to and from the first network when the sub-electric power is fed.

4. The apparatus of claim 1, wherein the first controller estimates a received signal strength indicator (RSSI) of the first network when the sub-electric power is not fed, and limits transmission of a data signal to and from the first network when the received signal strength indicator is higher than a preset value as a result of the estimation.

5. The apparatus of claim 4, wherein the first controller interrupts the connection with the first network when the (RSSI) is lower than a preset value of the estimated RSSI.

6. The apparatus of claim 1, wherein the first controller shifts overall control of the terminal to the second controller when the electronic device requests connection with the second network, and wherein the second controller controls overall functions of the terminal.

7. The apparatus of claim 1, wherein the second controller reads information regarding user authentication from the first controller when connection to the second network is accessible.

8. The apparatus of claim 1, wherein the electronic device comprises any external electronic devices like, but not limited to, a personal computer, a laptop computer or a mobile terminal.

9. A method of controlling a terminal comprising at least two modules connected to a network in a dual power feeding mode, the method comprising:
determining whether main electric power is being fed from an electronic device;
connecting to a first network in response to a request for connection thereto when the main electric power is being fed from the electronic device;
determining whether connection to a second network is accessible when a request for connection with the second network is generated during the connection to the first network; and
changing a connection state with the first network according to whether the sub-electric power is being fed from the electronic device when the connection with the second network is accessible, wherein a current of the main electric power or the sub-electric power fed from the electronic device is limited to a level where the function of the external electronic device is not restricted, and
wherein when an insufficient amount of main electric power is being fed for operation, the terminal utilizes the dual power feeding mode of the electronic device to perform a handover and data communication in accordance with a received signal strength indicator (RSSI) of the network to which the user belongs.

10. The method of claim 9, wherein the determining whether the sub-electric power is being fed comprises determining whether the sub-electric power is fed by a connection with the electronic device through a Universal Serial Bus (USB).

11. The method of claim 9, further comprising maintaining transmission and reception of a data signal to and from the first network when the sub-electric power is fed.

12. The method of claim 9, further comprising:
estimating a received signal strength indicator (RSSI) of the first network when the sub-electric power is not being fed; and
limiting transmission and reception of a data signal to and from the first network when the RSSI is higher than a preset value of the estimated RSSI.

13. The method of claim 12, wherein the estimating the RSSI further comprises interrupting the connection with the first network when the RSSI is lower than the preset value of the estimated RSSI.

14. The method of claim 9, wherein the changing the connection state to the first network according to the feeding of the sub-electric power includes shifting the control of the terminal when the electronic device requests for connection to the second network.

15. The method of claim 9, wherein the changing the connection state to the first network according to the feeding of the sub-electric power further comprises reading information on user authentication when the connection to the second network is accessible.

16. The method of claim 9, wherein the electronic device comprises any external electronic devices like, but not limited to, a personal computer, a laptop computer or a mobile terminal.

* * * * *